D. W. MANNHARDT.
VALVE CAP.
APPLICATION FILED OCT. 17, 1921.
1,430,092.
Patented Sept. 26, 1922.
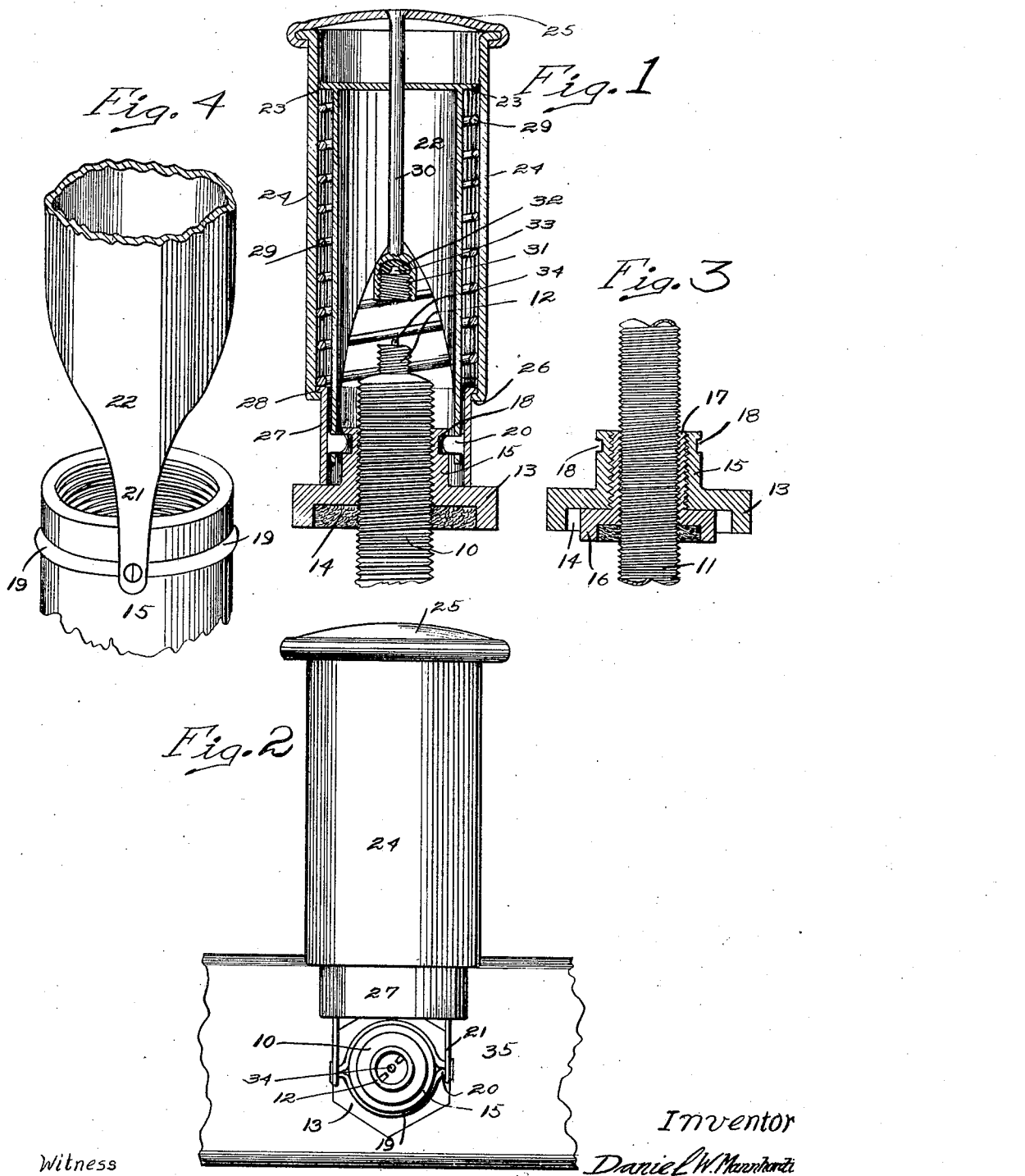

Patented Sept. 26, 1922.

1,430,092

UNITED STATES PATENT OFFICE.

DANIEL W. MANNHARDT, OF WASHINGTON, IOWA.

VALVE CAP.

Application filed October 17, 1921. Serial No. 508,127.

*To all whom it may concern:*

Be it known that I, DANIEL W. MANN-HARDT, a citizen of the United States, and a resident of Washington, in the county of Washington and State of Iowa, have invented a certain new and useful Valve Cap, of which the following is a specification.

My invention relates to an attachment for valve stems, particularly those used on inner tubes employed on motor vehicles.

The purpose of my invention is to provide a valve stem cap of simple construction, which will effectually prevent the entrance of dust or other foreign matter likely to interfere with the proper operation of the valve in the stem.

Still a further object is to provide such a valve stem cap, which is adapted to be mounted on the valve stem in such a way that it will not be accidentally lost off and is not disconnected therefrom during the period the tube is in use.

An additional object is to provide such a cap which takes the place of the ordinary valve stem cap and also of the dust cap, and which can be quickly and easily moved to position for putting air in the tube, and returned to position for closing and protecting the valve stem.

With these and other objects in view, my invention consists in the construction, arrangement and combination of the various parts of my device, whereby the objects contemplated are attained, as hereinafter more fully set forth, pointed out in my claims, and illustrated in the accompanying drawings; in which:

Figure 1 shows a vertical, sectional view through a valve cap, embodying my invention, installed on a valve stem.

Figure 2 shows a top or plan view of the same with the cap tilted to allow access to the valve stem.

Figure 3 shows a vertical, sectional view through the nut on which my valve cap is mounted; and Figure 4 shows a perspective view of the nut and the yoke, which is pivotally and rotatably mounted thereon, the other parts being omitted for permitting better illustration of the parts shown.

It is well-known that inner tubes for motor vehicles tires are made with valve stems, which valve stems are used for holding air into the tube and for permitting air to be forced into the tube.

In commercial practice, valve stems are made in two distinct sizes.

In Figure 1, I have shown a portion of an ordinary valve stem of the larger size, which I have indicated by the reference character 10. In Figure 3, I have shown one of the small stems, indicated by the character 11.

The valve stems 10 and 11 are screw-threaded on their exteriors and have at their upper ends, reduced, externally screw-threaded portions 12. Ordinarily, the reduced portion 12 is covered by a small cap and the larger dust cap is then screwed on the body of the stem 10 or 11.

I provide as a part of my device, a nut 13, angular in its outline, and having on its under side, a central recess 14, clearly shown in Figures 1 and 3. The nut 13 has a central, upwardly, extending cylindrical extension 15, and said extension and nut are internally screw-threaded to fit the larger sizes of stems 10.

It may be said in this connection that on all of the tubes that use the smaller stems 11, there is provided a nut 16, similar in general form to that already described, but smaller. The nut 16 has an extension 17, similar to the extension 15, which is screw-threaded internally and externally.

In the standard sizes, now commonly used, the sleeve 17 will snugly fit into the sleeve 15, as shown in Figure 3.

Thus by using the nut 16, which is furnished with the tube, it is possible to apply my device by screwing the nut 13 on the nut 16.

On the exterior of the extension 15 near the upper part thereof is an annular groove 18. In the groove 18 are mounted half rings 19, having at their adjacent ends, corresponding, outwardly, projecting lugs 20.

I provide a yoke, having the arms 21 provided with holes at their free ends, through which the lugs or ears 20 are extended. Said lugs or ears are then slightly flattened at their outer ends for holding the arms in position.

The ring members 19 will rotate freely in the groove 18.

For convenience in description, I have described the parts herein, as though the stem 10 and the valve cap were upright. The upper part of the yoke 21 may be of any suitable shape, but may have the form of a cylinder 22, having the projecting arms secured to the ring members 19 and cut away between the arms to permit the yoke to tilt over the valve stem without being interfered with thereby.

In the exterior of the yoke at the upper end of the cylindrical portion 22 is an annular rib or flange 23.

I provide a cover casing, comprising a casing 24 open at its lower end and having a closed upper end. At the lower end, the casing 24 may be provided with an internal flange 26. Telescopically mounted with relation to the casing 24 is a casing member 27, having its upper end received in the casing 24 and provided with an external flange 28.

The flanges 26 and 28 prevent the casings 24 and 27 from sliding entirely apart.

The casing 27 is slipped over the extension 15 and the lower part of the yoke 21, as shown in Figure 1. A coil spring 29 is mounted in the casing 24, surrounding the yoke 21 and the portion 22 thereof and is held between the flange 23 and the flange 28 and normally tends to force the two casings to the limit of their extended position, as shown in Figure 1.

Fixed to the cover 25 of the casing 24 is a stem 30, which extends downwardly within the casing and has at its lower end, a cap 31 internally screw-threaded to fit the reduced extension 12, and adapted to form a valve stem cap. The stem 30 is slidably and rotatably mounted in the upper end of the yoke 21, as shown in Figure 1.

Seated within the cap 31 is a suitable gasket 32, which is designed to engage the upper end of the reduced extension 12 and is provided in its under side with a recess 33 to receive the upper end of the stem 34 on the valve in the so-called valve stem 10.

It is of course understood that what has been called herein the valve stem 10 is really the valve casing.

In the practical installation and use of my improved valve cap, the device is completely asembled. The nut 13 is screwed onto the valve stem or valve casing 10 until the cap 31 stands just above and slightly spaced from the extension 12. Thereupon the casing 24 is forced downwardly, until it can be freely rotated for screwing the cap 31 on the extension 12.

When it is desired to inflate the tube, the casing 24 is rotated for thereby unscrewing the cap 31. The casing may then be forced upwardly, compressing the spring 29, until the cap 31 and casing 27 may clear the extension 12, whereupon the casing members and yoke may be tilted and the entire casing will clear the valve stem and leave it free of access for putting air in the tube.

After the tube has been filled with air, the casing can be pulled upwardly, and the cap 31 screwed into position.

It has been my purpose to make a device of the kind under consideration, which will be of universal use with all valve stems now made and employed with the various types of tubes sold.

The valve stems and casings vary, both as to size and as to length as illustrated in Figures 1 and 3. I have provided for the variation in size (diameter) by making the nut 13 and extension 15 of such internal diameter as to fit on the extension 17.

By providing the telescoping casing members and arranging the other parts as herein shown, I have made it possible to mount my caps on stems of different lengths, and yet at all times to entirely cover the exposed part of the stem, so as to keep out dust and to give the device a proper appearance.

If the stem on which the device is to be installed is a short one, the casing member 17 can be forced upwardly into the casing member 24 and the cap 31 may still be properly installed in position. If the stem is a long one, the spring 29 will extend the two casing members, as shown in Figure 1.

Owing to the fact that the nut 13 may become tight, when screwed against the rim of the wheel at different points in its rotation, it is important to mount the operative parts of my cap rotatably on the nut, so that they may be rotated on the nut, and then swung to the position shown for instance in Figure 2, without being interfered with by the spokes of the rim. The rim of the wheel is indicated at 35 in Figure 2.

The casing 24 is rotatable with relation to the yoke for permitting the cap 31 to be easily screwed onto the extension 12.

It will be seen that I have provided a valve stem casing cap, which is of simple construction.

The arrangement of the spring, which bears against the casing members of my device and against the yoke makes the spring and the parts connected therewith, serve as a lock to prevent the accidental unscrewing of the cap 31.

I claim as my invention:

1. In a valve stem cap, a nut designed to be mounted on a valve stem casing, a yoke device having arms pivotally mounted on said nut for rotation thereon, a slidable tubular casing for the ends of said arms, which are secured to the nut, a second tubular casing snugly telescopically mounted on the first casing, said casings having coacting outwardly and inwardly projecting flanges to limit their relative sliding movement, a valve stem cap, a stem secured to said cap and to said second casing and slidably mounted in said yoke device, a spring stop on said yoke device, and a spring within said tubular casing between said stop and said flanges.

2. In a valve stem cap, a nut adapted to be mounted on a valve stem casing, a yoke device having arms pivotally and rotatably mounted on said nut but not movable longitudinally thereof, a casing yieldingly telescopically mounted on said yoke device, a valve stem cap, a stem thereon slidably and rotatably extended through said yoke device and fixed to said casing.

3. A cap for inner tube valve stems or casings and the like, comprising a threaded nut, having a reduced portion, a yoke mounted thereon for pivotal and rotary movement but not for longitudinal movement, a casing receiving said yoke, closed at its outer end, a stem secured at one end to the closed end of said casing and having at its other end a valve stem cap, and means for yieldingly connecting said casing and yoke.

4. A cap for inner tube valve stems or casings and the like, comprising a threaded nut having a reduced portion, a yoke mounted thereon for pivotal and rotary movement, a casing receiving said yoke, closed at its outer end, a stem secured at one end to the closed end of said casing and having at its other end a valve stem cap, said casing being made of two parts telescopically connected, means for yieldingly connecting one of said casing parts and said yoke and for tending to hold the casing parts at the limit of their telescopic movement in one direction.

5. A cap for valve stem casings and the like, comprising a threaded nut, a yoke pivoted thereon, a casing receiving said yoke, said casing being adapted in one of its positions to sit on said nut, a valve stem cap having a stem fixed to said cap and slidably and rotatably extended through said yoke, and a yielding member interposed between the yoke and the casing.

6. In a device of the class described, a nut designed to be mounted on a valve stem casing, a yoke having its arms pivoted to said nut, a casing receiving said yoke, said yoke having a flange at its upper end, said casing having a flange at its lower end, and a spring interposed between the casing and the yoke and between said flanges, whereby when the device is installed on a valve stem casing and the spring is expanded, the casing will sit on the nut, and when the casing is drawn away from the nut, the spring is contracted and the casing and yoke may be swung on the pivotal connection of the yoke clear of a valve stem casing.

DANIEL W. MANNHARDT.